United States Patent [19]
Antioletti et al.

[11] 3,776,670
[45] Dec. 4, 1973

[54] EXTRUSION HEAD FOR PRODUCING A RESISTANT ELEMENT OF A CONVEYOR BELT, DRIVING BELT AND THE LIKE

[75] Inventors: Attilio Antioletti; Nino Madonini, both of Milan, Italy

[73] Assignee: Industrie Pirelli S.p.A., Milan, Italy

[22] Filed: Mar. 21, 1972

[21] Appl. No.: 236,794

Related U.S. Application Data
[63] Continuation of Ser. No. 889,260, Dec. 30, 1969, abandoned.

[30] Foreign Application Priority Data
Jan. 1, 1969    Italy ............................. 11173 A/69

[52] U.S. Cl. ................................................ 425/114
[51] Int. Cl. ............................................ B28b 21/56
[58] Field of Search ................... 425/113, 114, 381, 425/382, 192, 378

[56] References Cited
UNITED STATES PATENTS

| | | | |
|---|---|---|---|
| 3,058,493 | 10/1962 | Muller | 425/114 X |
| 3,405,426 | 10/1968 | Donald | 425/114 |
| 1,859,901 | 5/1932 | Trebes | 425/113 |
| 2,874,411 | 2/1959 | Berquist | 425/114 |
| 3,290,727 | 12/1966 | Petzetakis | 425/381 X |
| 3,497,915 | 3/1970 | Ronden | 425/192 |
| 3,546,743 | 12/1970 | Roth | 425/381 X |
| 3,581,343 | 6/1971 | Henrikson | 425/192 X |
| 3,694,131 | 9/1972 | Stuart | 425/113 |

*Primary Examiner*—J. Spencer Overholser
*Assistant Examiner*—John S. Brown
*Attorney*—Stevens, Davis, Miller & Mosher

[57] ABSTRACT

This invention pertains to an extrusion head for producing a resistant element of a conveyor belt or the like, the particular resistant structure of which comprises metal wires or threads of various diametrical dimensions. The extrusion head is capable of producing a tube of uncured elastomeric material in which longitudinal metal wires or threads are embedded during its formation. The tube is then cut along one of its generatrices by suitable means and is converted to a flat band.

4 Claims, 2 Drawing Figures

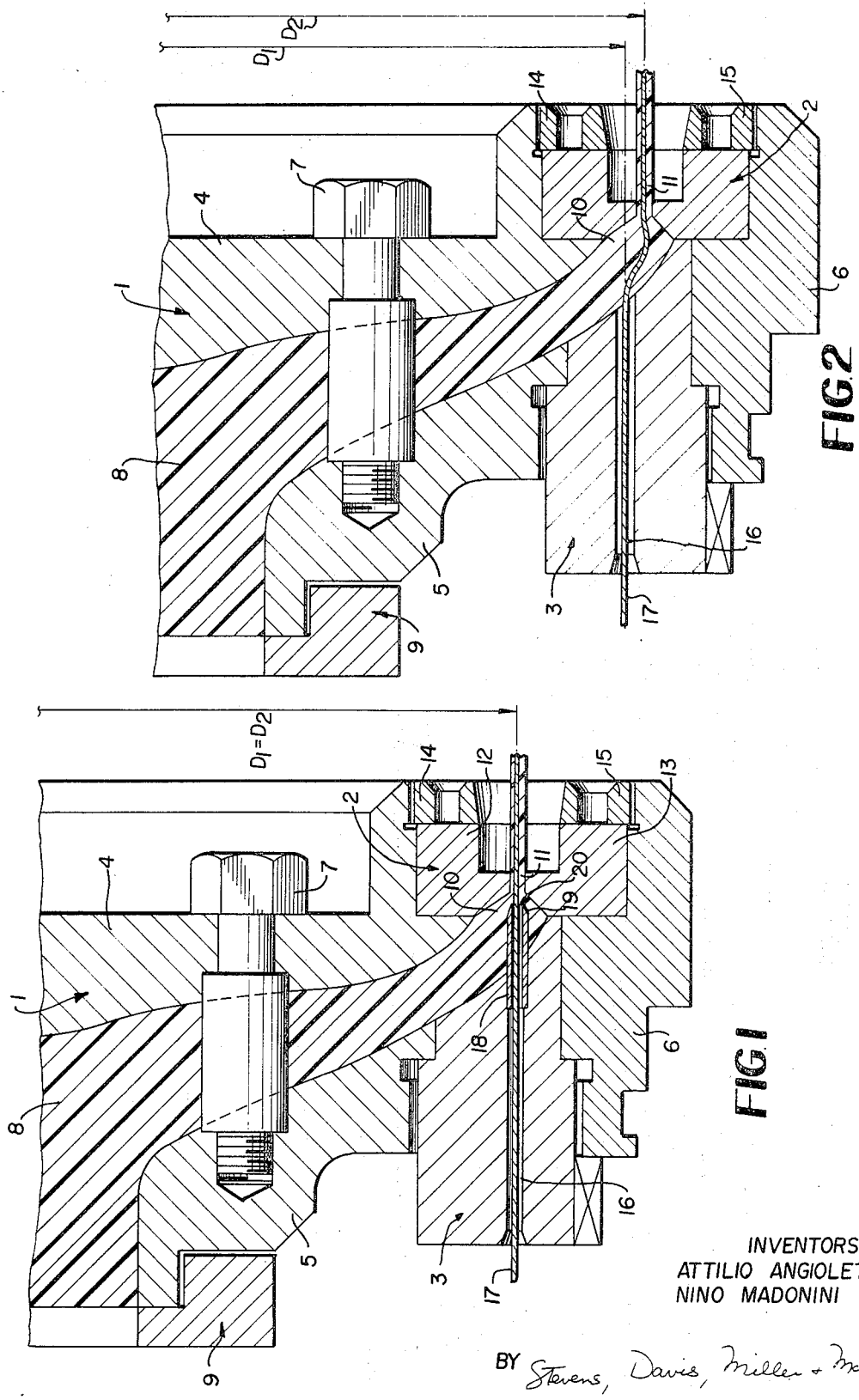

EXTRUSION HEAD FOR PRODUCING A RESISTANT ELEMENT OF A CONVEYOR BELT, DRIVING BELT AND THE LIKE

This is a continuation, of application Ser. No. 889,260, filed 12/30/69 and now abandoned.

The background of this invention indicates devices for producing the resistant element of a conveyor belt, driving belt and the like, are already known, but are rather complicated due to the need of maintaining a correct parallel relationship between the longitudinal metal wires or textile threads therein embedded. These known devices, which produce directly a flat band, are to be provided with means for placing each wire under tension and have to carry out preliminary molding operations, which result in a discontinuous processing. One consequence of the complicated and delicate structure of such known devices is the high cost of the articles produced with them.

The present invention aims at providing a device which may allow the continuous production of the resistant element of a conveyor belt for example in the form of a band of elastomeric material containing longitudinal metal wires or textile threads, and which is very simple, cheap and strong.

Briefly summarized the present invention provides an extrusion head for producing at first a tube of elastomeric material containing reinforcing metal wires or textile threads and for subsequently converting it, with appropriate means, into a flat band by cutting it along one of its generatrices. This comprises three parts removably connected to one another by known means; namely, a conventional body of the extrusion head, comprising a single duct for the admission of the elastomeric material, a first annular element provided with an annular opening constituting the extrusion mouth and the terminal portion of the admission duct, and a second annular element provided with through openings for the introduction of the wires in the extrusion head, the axes of said through openings being parallel to the axis of the extrusion head.

The present invention will be more clearly understood from the following detailed description, given by way of nonlimiting example and made with reference to the attached sheet of drawing, in which:

FIG. 1 represents in section and extrusion head: and

FIG. 2 represents in section an extrusion head in accordance with the instant invention according to a preferred embodiment of the invention.

The extrusion head shown in FIG. 1 and used for the formation of a tube of elastomeric material, comprises an element 1 constituting its true body, an element 2, hereinafter called "first annular element" and an element 3, hereinafter called "second annular element."

Appropriate means (not shown in the drawings) for cutting the produced tube along one of its generatrices can be connected to the extrusion head. Such means may be a blade, or by a rigid block inserted in the extrusion mouth to interrupt the continuity of the latter.

More precisely, the element 1 is formed by three parts, indicated by the reference numerals 4, 5 and 6. The parts 4 and 5 of element 1 are appropriately shaped in order to form, after being removably joined by screws 7, the main portion of an admission duct 8, through which the elastomeric material flows.

Part 6 is of annular form and is indirectly connected to the parts 4 and 5. The admission duct 8, through which flows the elastomeric material coming from an extruder 9, terminates, in the form of a duct 10 of generally frusto-conical cross section, within the body of the first annular element 2. Duct 10, among the other tasks which will be explained below, has the task of joining that part of the admission duct 8 which is obtained in the element 1, with an annular opening 11, acting as an extrusion mouth. The reason the first annular element 2 is removably connected to the element 1 of the extrusion head is that it can be replaced by another first annular element, so as to obtain tubes of equal diameter, but of different thickness. More particularly, the first annular element 2 is is composed of two parts 12 and 13. Part 12 is connected by means of a ring nut 14 to the part 4 of the element 1, and the part 13 is connected by means of a ring nut 15 to the part 6 of the element 1.

The element 1 of the extrusion head, on its side opposed to that carrying the first annular element 2, is provided with a second annular element 3, also removably fastened, on which there are through openings 16, through which metal wires or textile threads 17, which must be embedded in the wall of the tube of elastomeric material, may penetrate in the extrusion head.

The number of through openings corresponds to the number of wires to be inserted in the wall of the tube of elastomeric material, and the distance between said through openings 16 corresponds to the desired distance between the wires embedded in the tube wall. Small tubes 18, acting as wire-guides and having a tapered free end 19, are provided at the side of the second annular element which is internal to the extrusion head in correspondences of each through opening 16. The length of small tubes 18 is such that their tapered ends are disposed within the duct 10 of frusto-conical section and their outlets 20 face, at a small distance, the annular opening 11.

As for the second annular element 3 the reason it is removably connected to the element 1 is that it is interchangeable with another second annular element in order to produce tubes of equal diameter and equal thickness, containing however metal wires or textile threads of different diameter and having a different distance from each other.

As it can be seen in FIG. 1, the axes of the through openings 16 are parallel to the axis of the extrusion head, and the diameter D1 of the theoretical cylinder containing as generatrices the axes of the through openings 16 is equal to the diameter D2 of the theoretical cylinder passing through the midline of the annular opening 11. The reason and the importance of these features will be clearly apparent from the following description of the method.

In operation of the extrusion head, the elastomeric material, pushed by the screw of the extruder 9, penetrates inside the extrusion head, flowing along the admission duct 8, and discharges from the annular opening 11 in the form of a tube, which is cut along one of its generatrices by means not illustrated. At the same time the metal wires or textile threads 17 penetrate in the extrusion head through the through openings 16 and outcome from said annular opening 11, remaining embedded in the tube wall.

The wires 17, in their travel inside the extrusion head, are guided, by the small tubes 18 constituting an extension of the through openings 16, in a position internal to the duct 10 in which the fluid threads of elastomeric material are oriented in such a way as not to affect the travel of the wires.

The reason the free ends 19 of the small tubes 18 are tapered is due to the need of affecting as little as possible the path of the fluid threads in the zone where the wires are free; that is, unguided.

All the wires 17, in their travel inside the extrusion head and in the portion of tube not yet cut along one of its generatrices, follow a rectilinear path, parallel to the axis of the extrusion head.

The wires are correctly parallel and equidistant with respect to one another, and are well centered in the tube wall, since they follow the rectilinear path indicated above without being subjected to any disturbing action. This is due to the fact that they are guided for a long length within the extrusion head (through openings 16 and small tubes 18) and to the fact that, wherever they contact the elastomeric material, by virtue of the symmetrical disposition of the fluid threads surrounding them, they are not subjected to thrusts admitting components perpendicular to their axes which would affect their rectilinear path.

Moreover, the parallel relationship of the through openings with the axis of the extrusion head has the task of reducing friction of the wires during their passage in the extruder head.

The advancement of the wires is in fact carried out only by exploiting the motion of the elastomeric material, which provides another important action, explained herebelow.

The tapered shape of the portion 10 of the admission duct 8 results in a progressive reduction in the room available for the passage of the elastomeric material towards the annular opening 11. In turn, the gradual reduction in the room of duct 8 results in a gradual increase of the speed of the elastomeric material, which reaches its maximum value at the annular opening 11.

The end 20 of each small tube 18 faces at a small distance the annular opening 11 and in the space between said elements (i.e., ends 20 of the small tubes 18, annular opening 11), the wires are free or unguided, but are protected against any disturbing action for the fact that in consequence of the above-described phenomenon, they result stretched in said zone (and for the above indicated fact that said wires 17 are disposed along the axis of symmetry of the fluid threads of elastomeric material surrounding them). The stretch existing in the wires 17 is due to the fact that they move at the same speed which the elastomeric material has within the annular opening 11, whereas the elastomeric material, at any point within the portion 10 of the admission duct 8, has a lower speed. In other words, in the zone where the wire is not guided, it is braked by the elastomeric material, which gives rise to the above indicated tension stress.

The distance between the end 20 of the small tubes 18 and the initial section of the annular opening 11 varies as a function of the chemical-physical nature of the elastomeric material and, as a limit event, said distance does not exist.

Obviously, in this latter case, the wires 17 are not subjected to a tension stress by part of the elastomeric material.

In the embodiment illustrated by FIG. 2, there are an element 1 or extruder body, a first annular element 2 and a second annular element 3. Also in this case the largest part of the diverging duct 8 is obtained in element 1, or extruder body, and the terminal part 10 of said duct is obtained in the second annular element, wherein the opening 11, constituting the extrusion head, is also foreseen.

In turn, the second annular element 3, as in the embodiment shown in FIG. 1, is provided with a plurality of through openings 16 for the introduction of the wires in the extruder head. In this embodiment the second annular element 3 differs from that of the embodiment shown in FIG. 1, since small tubes 18, such as those of FIG. 1, are not required to lead to through openings 16, but rather these openings open directly into the admission duct 8.

As it can be seen in FIG. 2, the axes of the through openings 16 are parallel to the axis of the extrusion head and the diameter D1 of the theoretical cylinder containing as generatrices the axes of the through openings 16 is less than the diameter D2 of the theoretical cylinder passing through the midline of the annular opening 11.

The reason and the importance of the above indicated characteristics will be more clearly apparent from the following.

In the operation of the extrusion head of FIG. 2, the elastomeric material, pushed by the screw of the extruder 9, penetrates inside the extrusion head by flowing along the duct 8 and discharges from the annular opening 11 in the form of a tube which is cut along one of its generatrices. At the same time, the metal wires or textile threads 17, penetrating through the through openings 16, also discharge from the annular opening 11 and remain embedded in the tube wall. By virtue of the longitudinal dimension of the through openings 16, the wires 17 are guided for a long length inside the extrusion head, but, at the zone in which they pass through the admission duct 8, they are free; namely, unguided and are therefore subjected to the thrust exerted by the elastomeric material.

In fact, at the points in which the through openings 16 open in the duct 3, the fluid threads of elastomeric material have an inclined path with respect to the axis of said openings 16, so that the elastomeric material displaces radially the wires 17, deviating them away from the axis of the extrusion head. To obtain a correct centering of the wires in the annular opening 11 and therefore in the tube wall, the above indicated diameter D1 is smaller than diameter D2.

To allow the wires to oppose a certain resistance to the thrust of the elastomeric material, it is necessary to impart to them a certain tension of the wires, which is obtained by partially or totally exploiting the motion of the elastomeric material.

As previously said, the wires are subjected to dragging stresses, exerted by the elastomeric material, which cause them to move in the direction of advancement of the tube.

Moreover, in consequence of the fact that the through openings 16 put the duct 18 into communication with the atmosphere, and of the fact that the elastomeric material inside the extrusion head is under pressure, the elastomeric material present in duct 8 is subjected to a sudden pressure stop at the points where the openings 16 open into it.

This pressure drop causes a backflow of elastomeric material inside the openings 16. However, the material does not flow out from them, since it is dragged again into the duct 8 by the wires 17.

The backflow of material into the openings 16 applies to the wires a force of opposite sense with respect to the force which causes their forward motion, so that the wires are stretched in the zone in which they pass through the duct 8, in which they are unguided, and the radial thrust by the elastomeric material is partially overcome.

The tension originated in the wires 17 in the zone where they pass through the admission duct 8 and the duct 10 of frusto-conical section is such that the wires 17 are arranged at the midline of the thickness of the tube wall and then, after cutting the latter along one of its generatrices, at the midline of the thickness of the band.

In both of the indicated embodiments the ratio between the diameter of the annular opening constituting the extrusion mouth and the inner diameter of the extruder cavity is practically not smaller than 3 (lower values being not excluded however for the purposes of the invention), so that it is possible to ensure a cheaper processing, since small extruders can be used to produce bands of considerable transversal dimensions.

It should be understood that, although certain embodiments of the present invention have been described and illustrated, it includes any possible embodiment deriving from the above indicated inventive concept.

What is claimed as new is:

1. An extrusion head for manufacturing tubes of elastomeric material having longitudinal reinforcing strands incorporated therein, which tubes are cuttable along a generatrix to thereby be converted into flat bands, said extrusion head comprising a cup-shaped annular and diverging through duct for conveying the elastomeric material from an extruder to the annular outlet for the tube, a plurality of holes opening into said duct, said holes being rectilinear and parallel to one another whereby, during operation, an elastomeric material may be discharged from an extruder into said duct and through said outlet while at the same time reinforcing strand may be passed from an external source through said holes and into said outlet within the thickness of the elastomeric material whereby an elastomeric tube having reinforcing strands embedded within its wall thickness issues from said outlet, said through duct having its end at the annular outlet of frusto-conical section with walls nonsymmetrically convergent with respect to each other and towards said annular outlet and such that the ideal projection of said annular outlet is internal to said frusto-conical section and is spaced by the wall of the latter, whereby the flow velocity of the elastomeric material increases as it approaches said outlet relative to its velocity upstream of said outlet and the components of the velocity of the fluid threads of the flow of elastomeric material admit a straight line, on which the resultant lies which passes through the center of the outlet opening and is coaxial to the axis of the through duct, such velocity increase acting as a forward dragging force upon such strands whereby they are automatically tensioned and centered within the radial thickness of said outlet.

2. The extrusion head of claim 1 wherein said plurality of holes opening into said duct are arranged along the diameter of a circle which is smaller than the diameter of said annular outlet, said holes opening directly into said portion of said duct which leads into said outlet whereby reinforcing strands passing into said duct portion are deflected radially outwardly in passing from said apertures to said outlet.

3. The extrusion head of claim 1 wherein said plurality of holes opening into said duct are arranged along the diameter of a circle which has a centerline diameter equal to that of said annular outlet and wherein strand guide tubes are mounted within said holes and extend into said duct to within a distance from said outlet, said tubes acting to protect the reinforcing strands within said duct against deflecting forces imposed by the flowing elastomeric material.

4. The extrusion tube of claim 3, wherein the outer walls of said tubes at their ends nearest said outlet are inwardly tapered towards their ends.

* * * * *